June 1, 1948.  M. N. YARDENY  2,442,739
DUAL CONTROL APPARATUS FOR CONTINUOUS AND PRE-SELECTED MULTITURN MOTION
Filed July 15, 1944  2 Sheets-Sheet 1
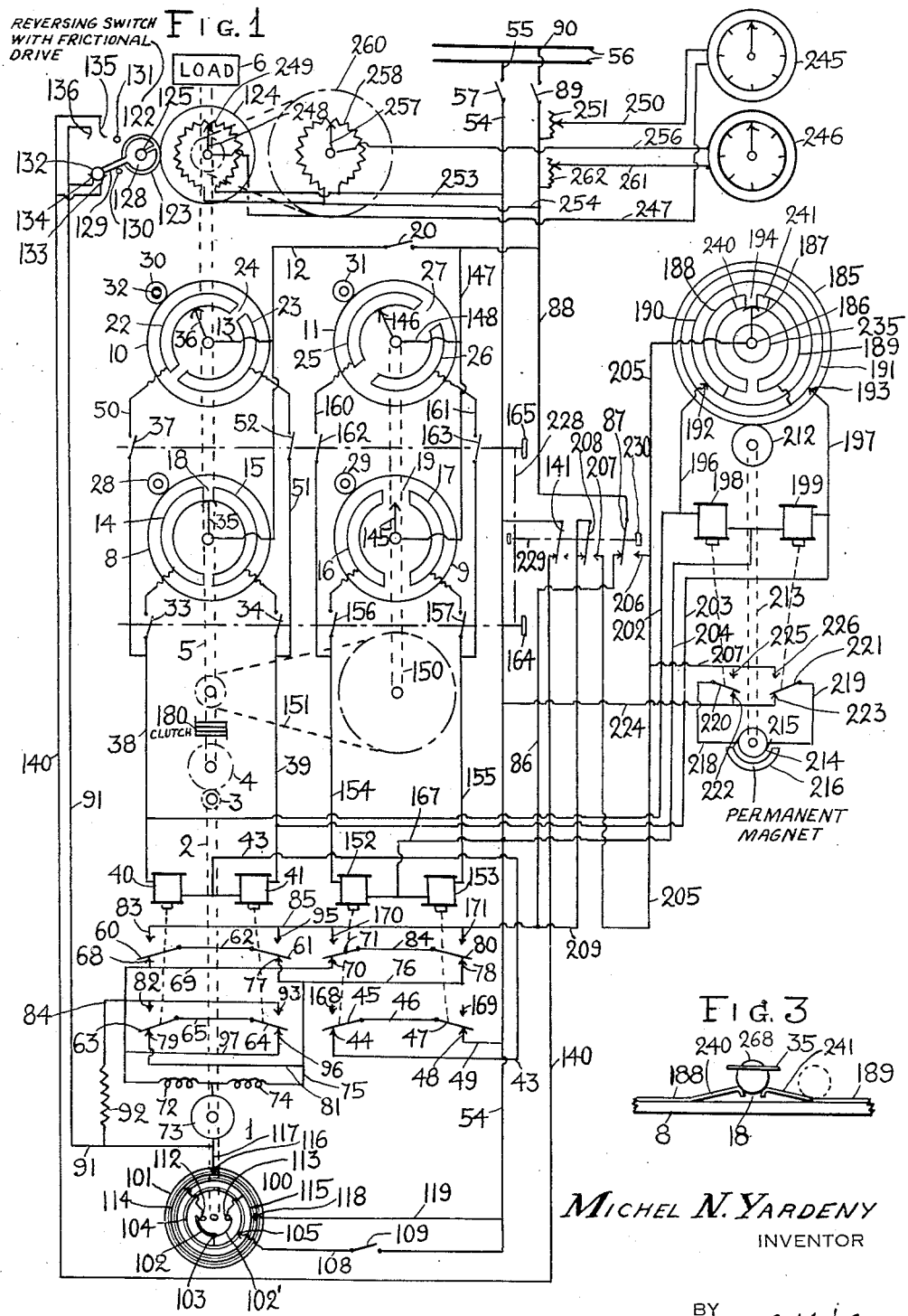
Michel N. Yardeny
INVENTOR
BY John P. Nikonow
ATTORNEY June 1, 1948.   M. N. YARDENY   2,442,739
DUAL CONTROL APPARATUS FOR CONTINUOUS AND PRE-SELECTED MULTITURN MOTION
Filed July 15, 1944   2 Sheets-Sheet 2
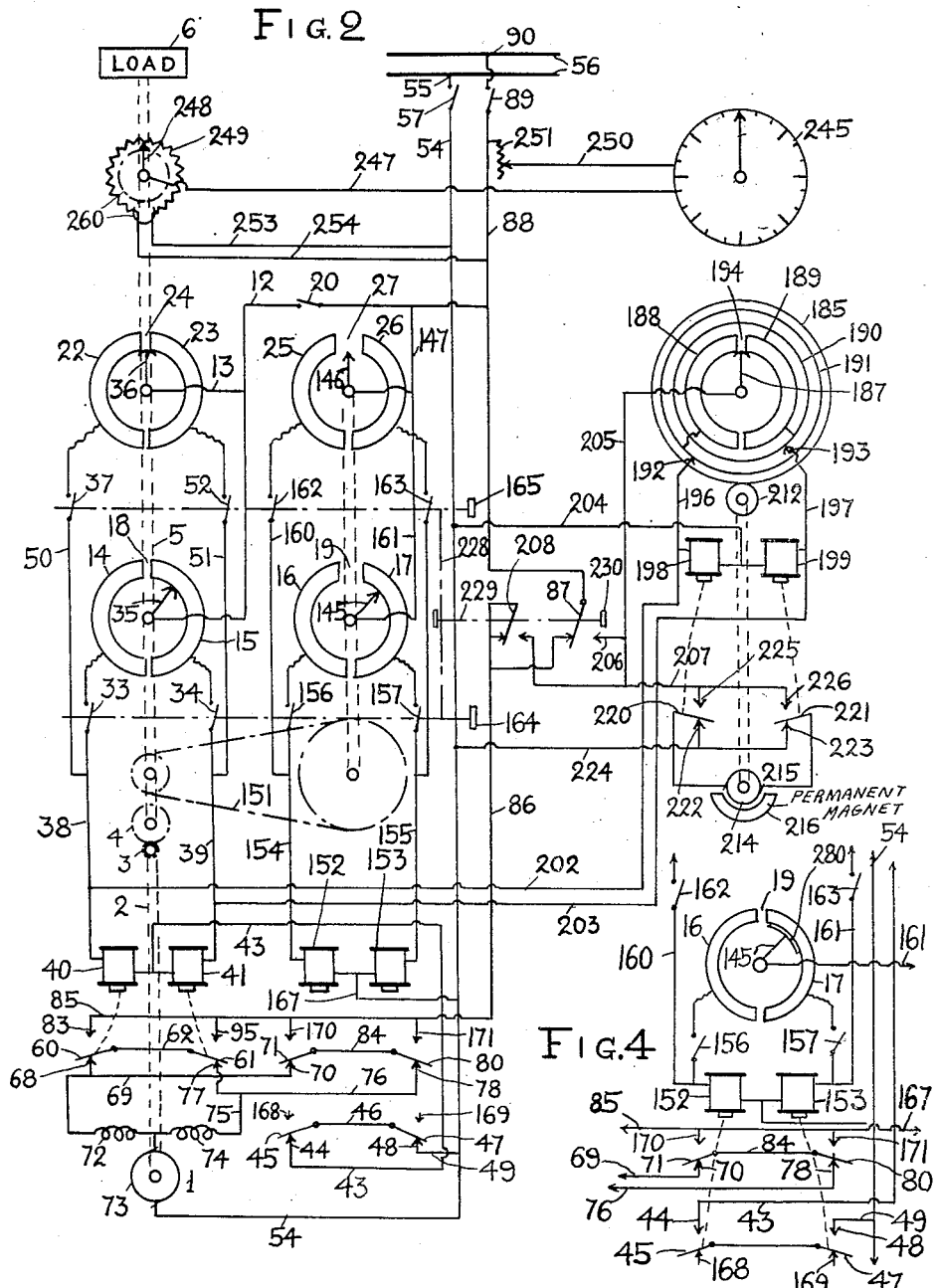
MICHEL N. YARDENY
INVENTOR
BY John P. Wilson
ATTORNEY Patented June 1, 1948

2,442,739

UNITED STATES PATENT OFFICE 2,442,739

DUAL CONTROL APPARATUS FOR CONTINUOUS AND PRESELECTED MULTI-TURN MOTION

Michel N. Yardeny, New York, N. Y.

Application July 15, 1944, Serial No. 545,124

9 Claims. (Cl. 318—31)

My invention relates to control apparatus and has particular reference to control apparatus employing drive means and control elements for placing a useful load in a desired position.

One important feature of my invention is to provide a control apparatus comprising two control units which can be used selectively for either placing the useful load in one of several predetermined positions or in any desired position. The movement of the load is preferably effected by a rotary drive means, preferably including an electric motor, by which any angular displacement may be imparted to the load. The total range of the movement of the load driving shaft may be from a fraction of one revolution to several revolutions.

Another feature of my invention is to provide means to vary the speed of the driving means such as a motor in the different stages of the movement as, for instance, to advance the load more rapidly in the first stages of its movement which may require a number of complete revolutions of the load shaft, or to reduce the speed of the driving motor during the last stage of the movement when a fraction of the last revolution is traversed by the load shaft in order to facilitate the stopping of the driving means when the exact position of the load is reached.

Another feature of the invention is to provide means to reduce the speed of the driving means or the motor still further in response to a reversal of the direction of rotation of the drive means, resulting from an overrunning of the stopping position by the control elements because of inertia of the moving parts.

Still another feature of the invention is to provide means to reduce the speed of the motor or drive means when the unit for placing the load in any desired position or for continuous or "follow-up" control is used, thereby facilitating the accurate movement of the load to the desired position, while the first unit, for placing the load automatically in a selected predetermined position, can be used with a motor running at a much higher speed. The drive means for the load is therefore operated at different speeds, depending on the control unit used. Thus, for instance, a moderately reduced speed may be used for the continuous movement control, full speed for the automatic predetermined position control, and considerably reduced speed may be used for a short time during the process of stopping the motor, as means for preventing motor oscillations or hunting.

My dual control system is particularly useful for applications for moving a useful load through a certain distance where several revolutions must be made by the driving member. Such an operation may be required, for instance, for tuning a radio receiver by varying inductance of a coil, for which purpose an iron core is moved in or out of the coil, a suitable screw mechanism being employed for moving the core. The screw must be then given a predetermined number of revolutions for moving the core to a desired position. The predetermined position control is used in such a case for rapidly tuning the receiver to one of the several definite frequencies, and the continuous movement control is used for turning the receiver to any desired frequency. The predetermined position control is more rapid and automatic and is preferred when the receiver is used for a few often used frequencies.

Other important advantages, objects and features of this invention will be apparent from the perusal of the accompanying specification and drawings in which—

Fig. 1 is a diagrammatic view of my apparatus showing the arrangement for operating the load motor by the use of two control units or transmitters, one of which is used for placing the load in one of several predetermined positions, the other being used for placing the load in any desired position;

Fig. 2 is a similar view of a simplified system;

Fig. 3 is a detail view of control elements; and

Fig. 4 is a fractional diagrammatic view of a modified control apparatus.

My control apparatus comprises two control units, and a receiver motor 1 connected by a suitable transmission such as a shaft 2, a set of gears 3, 4 and a shaft 5, to a useful load 6.

The first control unit, for placing the load in one of several predetermined positions within a range from a fraction of one revolution to several revolutions includes a plurality of selectors, each selector comprising two pairs of control elements, only two such selectors being shown on the drawing for the sake of simplicity. However, any required number of pairs may be employed in actual practice. The selectors comprise discs 8, 9, 10, 11, etc. One element of each pair comprises a pair of metal segments 14, 15, 16, 17 mounted on the discs 8, 9 separated by gaps 18, 19. The other discs 10 and 11 support metal segments 22, 23 separated by a gap 24, and segments 25, 26 separated by a gap 27. The discs are suitably supported at the periphery but can be rotated to adjust the relative positions of the gaps, for which purposes the discs are engaged by frictional or other pinions 28, 29, 30, 31 mounted on shafts 32 which can be manually rotated for placing the discs in any desired position. The segments 14, 15 and 22, 23 are engaged by contact arms 35, 36 mounted on the shaft 5, the contacting portions of the arms being sufficiently wide to bridge the gaps between the segments. The arms are connected by leads 12, 13 and a switch 29 to a lead 88.

The segments 14, 15 are connected by leads 38, 39 and switches 33, 34 with the ends of relay coils 40, 41. The segments 22, 23 being connected to the coils by leads 50, 51 and switches 37, 52. The other ends of the coils are joined together and connected by a lead 43 to a contact point 44 normally engaged by a relay arm 45. The arm 45 is connected by a lead 46 to a second arm 47 normally engaging a contact point 48 connected by a lead 49 to a lead 54. The latter is connected to a terminal 55 of a source of current 56 through a switch 57. The relay coils 40, 41 operate relay contact arms 60, 61 connected together by a lead 62, and also contact arms 63, 64 connected together by a lead 65. The arm 60 normally engages a contact point 68 connected to a lead 69 extending at one end to a contact point 70 normally engaged by a relay arm 71. The other end of lead 69 is connected to one end of a field winding 72 of the motor 1, the other end of the winding being connected to one brush of an armature 73 of the motor 1 and to one end of a second field winding 74. The two windings are used alternatively for causing the motor to rotate in one or the other direction. The other end of the winding 74 is connected by a lead 75 to a lead 76, one end of which is connected to a contact point 77 normally engaged by the arm 61 of relay 41, the other end being connected to a contact point 78 normally engaged by an arm 80. The arm 63 of relay 40 normally engages a contact point 79 connected by a lead 81 to the lead 75. The arm 64 of relay 41 normally engages a contact point 96 connected to a lead 97 which in turn is connected to lead 69.

The contact arms 60, 63 when attracted by coil 40, engage contact points 83, 82. The point 83 is connected by a lead 85 to a lead 86 connected by a switch 87, lead 88 and switch 89 to the terminal 90 of the source 56. The point 82 is connected through a lead 84 and a resistor 92 to a lead 91 extending from the other brush of the armature 73. The arms 61, 64 when attracted by relay 41 engage a point 95 connected to lead 85 and a point 93 connected to lead 84 respectively. The armature 73 is connected to the other terminal 55 of the source of current through a speed regulating governor 100 having an insulation base 101 mounted for rotation on an extension of the armature shaft 2.

A contact spring comprising two portions 102, 102' is mounted on a post 103 on the base 101, of the governor, the post being connected to a collector ring 104 engaged by a contact brush 105 connected by a lead 108 and a switch 109 to the lead 54. The ends of the springs or spring portions 102, 102' normally engage contact points 112, 113 connected to collector rings 114, 115 respectively. The ring 114 is engaged by a brush 116 and connected by a lead 117 to the lead 91. The ring 115 is engaged by a brush 118, connected by a lead 119 to the lead 54. The governor is normally rendered inoperative by being by-passed or short circuited by a reversing switch 122 comprising a roller or disc 123 frictionally or otherwise engaging a wheel 124 on the load driving shaft 5. The roller 123 is mounted on a shaft 125 frictionally engaged by a block 128 with a finger 129 normally held by the rotation of the shaft 125 against one of two stationary posts or stops 130, 131 depending on the direction of the rotation. The end of the finger 129 is provided with a contact roller or ball 132 which connects together resilient contact points 133, 134 or 135, 136, depending on the position of the finger 129. The points 134, 136 are connected to the lead 91 and the points 133, 135 are connected to a lead 140 which is connected by a switch 141 to the lead 54. The governor therefore is operatively included in the motor circuit only when the motor is reversed and during the time when the reversing switch arm 129 moves from one of the stops 130, 131 to the other.

The governor performs a very important function of preventing or suppressing any tendency on the part of the motor to oscillate or hunt when the control elements reach a stopping position, i. e., a position in which a slight movement to one or the other side causes reversal of the motor rotation. The governor, by materially reducing the motor speed and weakening its torque, reduces the inertia of the moving parts to such an extent, that the control elements can no longer overrun the stopping point and the motor is stopped, usually after the first reversal of its rotation.

The segments 14, 15, 22, 23 control the rotation of the load shaft 5 within a range of about one half of one revolution in either direction, the second set of the segments 16, 17 and 25, 26 being used for controlling complete revolutions of the load shaft. The segments 16, 17, etc., are engaged by contact arms 145, 146 connected by leads 147, 148 to the lead 12. The arms 145, 146 are mounted on a shaft 150 connected by a suitable transmission 151 with the shaft 5. This transmission is of a relatively high ratio for allowing the shaft 5 to make a plurality of revolutions for one revolution of the shaft 150. Also, the gaps 19, 27 are made relatively wide in such manner that the contact arms 145 or 146 move from the edge of a segment to the middle of the gap while the corresponding contact arm 35 or 36 on the shaft 5 completes approximately one half of one revolution.

The segments 16, 17 are connected to the ends of relay coils 152, 153 by leads 154, 155 and switches 156, 157. The segments 25, 26 are similarly connected with these coils by leads 160, 161, and switches 162, 163. The joined ends of the coils are connected by a lead 167 to the lead 54.

The switches 33, 34, 156 and 157 are arranged to be simultaneously operated by a common handle 164, a similar handle 165 being provided for the simultaneous operation of the switches 37, 52, 162, 163.

The relay coils 152, 153 control the relay contact arms 45, 47, which engage dead or blind points 168, 169 when attracted; and the relay contact arms 71, 80 which when attracted by the coils, engage contact points 170, 171 connected with the leads 85, 86 and 209.

The operation of the previously described unit, which for convenience may be called "multi-revolution predetermined position control unit," is as follows:

Assuming that it is desired to place the load 6 in a new position controlled by the pair of selector discs 10, 11, to do this the corresponding switches 37, 52, 162, 163 are closed by the handle 165. Since both the contact arms 36, 146 engage the corresponding segments 22, 25, the relay coils will be energized as follows: current from the terminal 90 of the source 56 will flow through the switch 89, leads 88, 12, 147, 148 to arm 146, from there over segment 25, lead 160, switch 162, lead 154 to coil 152, then back through leads 167, 54 and switch 57 to the other terminal 55 of the source 56. As a result, the coil 152 will be energized, attracting the relay arms 45, 71. This will disconnect the circuit from the lead 43 to the relay coils 40, 41, rendering them inoperative regardless of the position of the contact arm 36 in relation to the segments 22, 23. The motor 1, however, will be energized, current passing from the terminal 90 through the switch 89, lead 88, switch 87, leads 86, 85, point 170, contact arm 71, lead 84, contact arm 80, point 78, leads 76, 75, motor winding 74, armature 73, lead 91, closed reversing switch 122, lead 140, switch 141, lead 54 and switch 57 to the other terminal 55 of the source 56.

The motor will therefore rotate in a direction for moving the contact arm 146 toward the gap 27. The shaft 5 will make several revolutions before the contact arm 146 reaches the edge of the segment 25, disconnecting the circuit for the relay coil 152. The coil 152 being deenergized, the contact arms 45 and 71 will be released. The arm 45, engaging the contact point 44, will close the circuit for the relay coil 40. Current will now flow from the terminal 90 through the switch 89, leads 88, closed switch 20 and lead 12, 13, contact arm 36, segment 22, lead 50, switch 37, lead 38, coil 40, lead 43, contact point 44, contact arm 45, lead 46, contact arm 47, point 48, leads 49, 54, and switch 57 back to the other terminal 55 of the source 56. The energized coil 40 will attract the contact arms 60, 63, thereby establishing the circuit for the motor 1 as follows: from the terminal 90, switch 89, lead 88, switch 87, leads 86, 85, point 83, contact arm 60, lead 62, contact arm 61, point 77, leads 76 and 75, winding 74, armature 73, lead 91, reversing switch 122, lead 140, switch 141, lead 54, switch 57, and the other terminal 55 of the source of current 56. The motor therefore will continue its rotation, moving the contact arm 36 toward the gap 24, until the arm 36 bridges the gap, energizing both the coils 40, 41 and deenergizing the motor 1 for stopping the same.

To facilitate the accurate stopping of the motor in the final position, the motor speed is reduced during the last stage of the operation, i. e. when the shaft 5 completes the last one half revolution under control of the contact arm 36. This reduction is accomplished for example by increasing the strength of the motor magnetic field, for which purpose the second winding 72 is also energized by current passing in a direction causing an increase of the strength of the field produced by the winding 74. This additional connection is effected by the contact arms 63, 64 as follows: current passing through the winding 74, at a point of connection to the armature 73, branches out and flows in a direction opposite to the normal, through the winding 72, leads 69 and 97, point 96, contact arm 64, lead 65, contact arm 63, point 82, lead 84, resistor 92, and to the lead 91. The resistor 92 reduces the current through the second winding 72 to prevent its overheating and to obtain the desired field characteristics.

Additional devices may also be provided to suppress or prevent the motor from oscillating or hunting back and forth when the gap 24 is reached by the contact arm 36. One of such devices comprises a frictional sliding reversing clutch 180 of conventional design. Another arrangement for suppressing hunting comprises the governor or rotary interrupter 100 which becomes temporarily operative for greatly reducing the motor speed after each reversal of its rotation when switch 122 previously described becomes active.

The switch 109 which may be operatively connected with switches 87, 208 or 141 obtain the lowest speed of the motor after the reversal thereby effectively preventing the hunting of the motor when the contact arm bridges the gap.

The second control unit, shown at the right of Fig. 1 is used for placing the load 6 in any desired position by rotating the shaft 5 through a number of revolutions and a fraction of the last revolution. This unit which may be called a "followup" or "continuous control" unit, comprises a disc 185 suitably mounted for rotation on an axis concentric with a shaft 186 supporting a contact arm 187. The disc, preferably made of an insulating material, mounts metal segments 188, 189 separated by a gap 194 and connected to collector rings 190, 191. The latter are engaged by contact brushes 192, 193 connected by leads 196, 197, to relay coils 198, 199 and by leads 202, 203 to the ends of the relay coils 40, 41. The joined ends of the coils 198, 199 are connected by a lead 204 to the lead 54. The contact arm 187 is connected by a lead 205 to a point 206 of the switch 87 and to a point 207 of a switch 208 connected by a lead 209 with the lead 86.

The disc 185 is engaged by a pinion 212, frictionally or otherwise, the pinion being mounted on a shaft 213 extending from the armature 214 of a motor 215. Any suitable reversible motor may be employed for this purpose, and a motor with a permanent magnet 216 is shown by way of an example. The armature is connected by leads 218, 219 with relay contact arms 220, 221, normally engaging contact points 222, 223 connected by a lead 224 to the lead 54. The contact arms, when attracted by the energized relay coils, 198, 199 engage contact points 225, 226 on a lead 207 connected to the lead 205.

The operation of the follow-up unit is as follows:

Before starting the operation of this unit, all the switches of the predetermined position unit must be opened. The switch handles 164, 165 may be for this purpose connected together by a link 228 operated by a rod 229 with a handle 230. The same rod 229 may be conveniently connected to the switches 141, 208 and 87 so that simultaneously with the opening of the switches of the first unit, the second unit will be connected for operation as follows: the switch 87, will disconnect lead 86 and the motor line 85 and will connect the lead 88 with the lead 205 through point 206 for energizing the relay coils 198, 199 through arm 187 and segments 188, 189 and for energizing or rendering operative the control motor 215; the switch 208 will connect the lead 205 through point 207 with lead 209 and the lead 85 for energizing the motor 1; and the switch 141 will disconnect the lead 140, rendering the reversing switch 122 inoperative thereby rendering the governor 100 continuously operative.

It should be noted that although it is desirable to reduce the motor speed for the operation of the follow-up control unit, the motor speed for the operation of the follow-up control unit, the motor speed should be preferably materially higher than the very low speed required for the stopping of the motor for preventing its hunting. To increase the limiting speed of the governor, the switch 109 is closed thereby rendering the heavier spring 102 operative. A lighter weight may be used, of course, instead of the heavier spring on the medium speed side of the governor spring.

It is also possible, if desired, to leave the reversing switch 122 operative for both units of control, using only the switch 109 for reducing the motor speed when the second unit is in operation.

Assuming that it is desired to rotate the shaft 5 to the right, the contact arm 187 is turned to the right, either manually, as by operating a knob 235, or by other suitable means. Current will then flow from the terminal 90 through the switch 89, lead 88, switch 87, point 206, lead 205, contact arm 187, segment 189, ring 191, brush 193, lead 197, coil 199, leads 204, 54, and switch 57 to the other terminal 55. The energized coil 199 will attract the relay contact arm 221, closing the circuit for the motor armature 214 through the terminal 90, switch 89, lead 88, switch 87, point 206, leads 205, 207, point 226, contact arm 221, lead 219, armature 214, lead 218, contact arm 220, point 222, and leads 224, 54 to the other terminal 55 through the switch 57. The motor will rotate the disc 185 for causing the gap 194 to follow the arm 187. The motor 215 will continue to rotate as long as the contact arm 187 is in contact with the segment 189. To facilitate this operation and to make it more rapid, the contact arm 187 with its ball contact 268 may be quickly moved to a position shown in dotted lines in Fig. 3 behind a raised portion 241 of the segment 189 which will retain the arm 187 by friction and will cause the arm to be rotated together with the disc 185, making as many revolutions as may be desired. To stop the motor it is only necessary to take hold of the knob 235 and stop it by hand until the motor, overcoming the resistance of the raised portion 241, brings the gap 18 into engagement with the ball 268 at the end of the contact arm.

The relay coil 41 will also be energized through a connecting lead 203, attracting the relay arms 61 and 64, causing the motor 1 to be energized as was explained above. The control segments of the first or predetermined position unit being disconnected, the motor 1 will rotate under the control of the second or follow up unit and will make the desired number of revolutions until it is stopped by holding the knob 235 and preventing its further rotation, thereby allowing the gap 194 to be bridged by the contact arm 187. Both the relay coils 198, 199 will be energized, causing the arms 220, 221 to be attracted as well as the arms 60, 61 and 63, 64 of the relays 40, 41. The armature 214 of the control motor 215 will be short circuited and dynamically braked by the permanent magnetic field. The motor 1 will be deenergized and also stopped as was explained above.

In view of the fact that the second or follow up set of the control elements controls only the starting and stopping of the shaft 5, but does not indicate its position, it is desirable to have an indicating device at the point of control which will indicate the true position of the load 6 or shaft 5. Any suitable indicators may be used for this purpose such as electric meters of a millivoltmeter type connected with potentiometers as shown on the drawing. Two such meters, 245, 246, may be used, one accurate reading of fractions of one revolution, the other for indicating complete revolutions. The meter 245 is connected by a lead 247 with a contact arm 248 of a potentiometer 249, and by a lead 250 with an adjustable resistor 251, for adjusting the zero point of the meter. The potentiometer is connected by leads 253, 254 with the leads 54 and 88 respectively. The contact arm 248 is mounted directly on the shaft 5 and makes the same number of revolutions as the latter. One terminal of the meter 246 is connected by a lead 256 with a contact arm 257 of a second potentiometer 258, the arm 257 being connected by a suitable transmission 260 with the shaft 5, the transmission preferably has the same ratio as the transmission 151, so that the meter 246 will indicate complete revolutions of the shaft 5, while the meter 245 will indicate fractions of one revolution. The other terminal of the meter 246 is connected by a lead 261 with a zero adjusting resistor 262. The potentiometer 258 is connected with the leads 253, 254.

The governor may be omitted as shown in Fig. 2 which represents a simplified system. Single pole double throw relays can be used instead of double pole relays because no provision for reducing the motor speed is needed. The motor windings and the armature will be then directly connected to the source of current as shown.

A single indicator 245 may be used operated by the potentiometer 249, the contact arm 248 being connected by a suitable transmission 260 to the load shaft 5. The indicator is then calibrated to indicate complete turns (or half turns) and fractions of one turn.

In the systems shown in Figs. 1 and 2 the gaps 19, 27 are wider than the contact arms 145, 146 so that the circuit for the relays 152, 153 is disconnected when a gap 19 or 27 is reached by the corresponding arm. It is also possible, however, to operate the device when the gaps 19, 27 are narrow and are abridged by the corresponding arms. Such an arrangement is shown in Fig. 4. The gap 19 is relatively narrow between the segments 16, 17, the contact arm 145′ having a contact end 280 of such a width that it bridges the gap 19 and can be moved for a distance corresponding to 180° of movement of the arm 35 of Fig. 1 while bridging the gap.

The only other difference in the connection is that the relay arms 45, 47 normally engage dead points 168, 169 and can energize the relays 40, 41, Fig. 1, only when both the arms 45, 47 are attracted by the energized coils 152, 153 when the gap 19 is bridged.

It will be understood that various features and principles of each of the embodiments of the invention above described or referred to may be utilized or substituted in other embodiments.

While the invention has been described in detail with respect to certain particular preferred examples, it will be understood by those skilled in the art after understanding the invention, various changes and further modification may be made without departing from the spirit and scope of the invention, and it is intended therefore in the appended claims to cover all such changes and modifications.

What is claimed as new and desired to be secured by Letters Patents is:

1. A control apparatus for placing a load in a selected one of a plurality of predetermined positions or in any desired position comprising driving means adapted to operate a useful load; a reversible motor operatively connected to the driving means; first electrical control means comprising a plurality of sets of control elements connected in a circuit with the motor, each set comprising two pairs of control elements, one element of each pair being movable and operatively connected to the driving means; transmission means connecting the movable elements of each set for moving the same at different ratios of speed; switch means to selectively energize one of the sets; electrical means connected with the motor to control the direction of the rotation of the motor by the relative position of the control elements of the selected set and for causing the driving means to complete a total movement within a range from a fraction of one cycle of movement of the driving means to several cycles of movement and to stop the motor in response to the movable control elements of the selected set reaching a predetermined position in relation to each other and to the other control element of the respective pair thereby placing the driving means in the selected predetermined position; second electrical control means comprising a pair of independently movable control members connected in the circuit with the motor; drive means to move one of the members, the other member being movable by other means; electrical means connected to control the motor by the relative position of the control members and to stop the motor in any desired position of the driving means in response to the control members reaching a predetermined relative position; switch means to selectively render one of the control means operative for the purpose aforesaid; means to reduce the speed of the motor; and second switch means arranged to render the speed reducing means operative for a limited amount of movement in response to the reversal of the motor.

2. A control apparatus for placing a load in a selected one of a plurality of predetermined positions or in any desired position comprising driving means adapted to operate a useful load; a reversible motor operatively connected to the driving means; first electrical control means comprising a plurality of sets of control elements connected in a circuit with the motor, each set comprising two pairs of control elements, one element of each pair being movable and operatively connected to the driving means; transmission means connecting the movable elements of each set for moving the same at different ratios of speed; switch means to selectively energize one of the sets; electrical means connected with the motor to control the direction of the rotation of the motor by the relative position of the control elements of the selected set and for causing the driving means to complete a total movement within a range from a fraction of one cycle of movement of the driving means to several cycles of movement and to stop the motor in response to the movable control elements of the selected set reaching a predetermined position in relation to each other and to the other control element of the respective pair thereby placing the driving means in the selected predetermined position; second electrical control means comprising a pair of independently movable control members connected in the circuit with the motor; drive means to move one of the members, the other member being movable by other means; electrical means connected to control the motor by the relative position of the control members and to stop the motor in any desired position of the driving means in response to the control members reaching a predetermined relative position; switch means to selectively render one of the control means operative; first means to reduce the speed of the motor to a relatively low value, second switch means arranged to render the speed reducing means operative for a limited amount of movement in response to the reversal of the motor, and in response to the first control means being rendered operative by the first switch means; second means to reduce the speed of the motor, the second speed reducing means being arranged to reduce the speed to a relatively higher value than the first speed reducing means; and means to render the second speed reducing means operative for the purposes aforesaid in response to the second control means being rendered operative.

3. A control apparatus for placing a load in a selected one of a plurality of predetermined positions, or in any desired position comprising driving means adapted to operate a useful load; a reversible motor operatively connected to the driving means; first electrical control means comprising a plurality of sets of control elements connected in circuit with the motor, each set comprising two pairs of control elements, one element of each pair being movable and operatively connected to the driving means; transmission means connecting the movable elements of each set for moving the same at different ratios of speed; switch means to selectively energize one of the sets; electrical means connected with the motor to control the direction of the rotation of the motor by the relative position of the control elements of the selected set and for causing the driving means to complete a total movement within a range from a fraction of one cycle of movement of the driving means to several cycles of movement and to stop the motor in response to the movable control elements of the selected set reaching a predetermined position in relation to each other and to the other control element of the respective pair thereby placing the driving means in the selected predetermined position; second electrical control means comprising a pair of independently movable control members connected in a circuit with a motor; drive means to move one of the members, the other member being movable by other means; electrical means connected to control the motor by the relative position of the control members and to stop the motor in any desired position of the driving means in response to the control members reaching a predetermined relative position; switch means to selectively render one of the control means operative; a governor operatively coupled with the motor for controlling the speed thereof; contact means in the governor responsible to the centrifugal force and arranged to control the electrical motor connections; and means to render the governor operative for the purposes aforesaid in response to the second control means being rendered operative for maintaining the motor speed at a predetermined limit.

4. A control apparatus for placing a load in a selected one of a plurality of predetermined positions or in any desired position comprising driving means adapted to operate a useful load; a reversible motor operatively connected to the driving means; first electrical control means comprising a plurality of sets of control elements connected in a circuit with the motor, each set comprising two pairs of control elements, one element of each pair being movable and operatively connected to the driving means; transmission means connecting the movable elements of each set for moving the same at different ratios of speed; switch means to selectively energize one of the sets; electrical means connected with a motor to control the direction of the rotation of the motor by the relative position of the control elements of the selected set and for causing the driving means to complete a total movement within a range from a fraction of one cycle of movement of the driving means to several cycles of movement and to stop the motor in response to the movable control elements of the selected set reaching a predetermined position in relation to each other and to the other control elements of the respective pair thereby placing the driving means in the selected predetermined position; second electrical control means comprising a pair of independently movable control members connected in a circuit with the motor; drive means to move one of the members, the other member being movable by other means; electrical means connected to control the motor by the relative position of the control members and to stop the motor in any desired position of the driving means in response to the control members reaching a predetermined relative position; switch means to selectively render one of the control means operative; a centrifugal governor operatively coupled with the motor; two sets of contact elements in the governor electrically connected with the motor and arranged to maintain the motor speed at two different limits; switch means to include one set of the contact elements in the motor circuit in response to the second control means being rendered operative; and switch means to include the other set of the contact elements in the motor circuit for a limited amount of movement in response to a reversal of the movement of the motor and in response to the first control means being rendered operative.

5. A control apparatus for placing a load in a selected one of a plurality of predetermined positions or in any desired position comprising rotary driving means adapted to operate a useful load; a reversible motor operatively connected to the driving means; first electrical control means comprising two pairs of relatively movable control elements connected in a circuit with the motor, one element of each pair comprising conducting means having a neutral point, the other element of each pair comprising a contact member for engaging the conducting means, and one element of each pair being movable by the driving means; relay means connected with the control elements to control the direction of rotation of the motor by the positions of the contact members relative to the neutral points; contact means controlled by the relay means to render one pair of the control elements operative and the other inoperative for completing the first stage of the total movement of the driving means for placing the driving means in the predetermined position within a range from a fraction of one revolution to several revolutions of the driving means, said contact means being further connected to render the first mentioned pair inoperative and the second mentioned pair operative in response to the contact member of the first mentioned pair reaching the corresponding neutral point for causing the driving means to complete the second stage of the total movement comprising a fraction of one revolution of the driving means thereby placing the driving means in the selected predetermined position; second electrical control means arranged to control the motor for placing the driving means in any desired position, said second control means comprising a pair of independently movable control members connected in a circuit with the motor; means to move one of the members, the other member being movable by other means; electrical means connected to control the motor by the relative position of the control members and to stop the motor in any desired position of the driving means in response to the control members reaching a predetermined relative position; and switch means to selectively render one of the control means operative for the purposes aforesaid.

6. A control apparatus for placing the load in a selected one of a plurality of predetermined positions or in any desired position comprising driving means adapted to operate a useful load; a reversible motor for operating the driving means; first electrical control means comprising a plurality of sets of control elements connected in a circuit with the motor, each set comprising two pairs of control elements, one element of each pair comprising conducting members separated by a gap, the other element of each pair comprising a contact member for engaging the conducting members, one element of each pair being movable, transmission means operatively connecting the driving means with the movable elements of each set for moving the same at different ratio of speed; switch means to selectively energize one set of elements; relay means connected with the control elements to control the direction of rotation of the motor by the positions of the contact members relative to the neutral points; contact means controlled by the relay means to render one pair of the selected set operative and the other pair inoperative for causing the driving means to complete the first stage of the total movement of the driving means, said stage being within a range from a fraction of one revolution to several revolutions, and to render the first mentioned pair inoperative in response to the contact member of the first mentioned pair reaching the corresponding gap; means to render the second mentioned pair of the selected set operative for causing the driving means to complete the second stage of the total movement comprising a fraction of one revolution thereby placing the driving means in the selected predetermined position; second electrical control means arranged to control the motor for placing the driving means in any desired position, said second control means comprising independently movable control members connected in a circuit with the motor; drive means to move one of the control members, the other control member being arranged to be moved by other means, one of the control members comprising conducting portions separated by a gap, the other control member comprising a contact arm for engaging the conducting portions; means to control the direction of motor rotation by the position of the contact arm at one or the other side of he gap and to stop the motor in response to the contact arm bridging the gap; means on the conducting portions to yieldably retain the contact arm on one of the conducting portions for a common movement of the members until the member operable by said other means is stopped; and switch means to render one of the control means operative and the other control means inoperative for the purposes aforesaid.

7. In a system for positioning a load to a selected one of a plurality of predetermined positions or to any desired position, in combination, a reversible motor for moving the load; a control device comprising a unit for causing the load to be moved through one or more complete revolutions and a unit for causing the load to be moved through a partial revolution, each unit having a member adjusted to cause movement of the load in a predetermined direction, the member of the complete revolution unit being adjusted for a number of unit distances equal to a predetermined number of revolutions through which the load is to be moved, the member of the partial revolution unit being adjusted to an extent depending upon a predetermined partial revolution through which the load is to be additionally moved, the said complete revolution unit being energized to move the load in the said predetermined direction with the said predetermind number of complete revolutions, and to energize the said partial revolution unit to continue load movement in the said predetermined direction for the said predetermined additional partial revolutions; speed reducing means for the motor; means responsive to a motor reversal to render said speed reducing means operative; a second control device for moving the load in any desired position, said second control device having a neutral position and comprising a pair of relatively movable members, one of the members being selectively adjusted to control directional rotation of the said load motor to move the load to desired positions; means for moving the other member in a direction to restore the said second control device to its neutral position to stop motor rotation; and switch means selectively operated to place the load motor under the control of the first control device or under the control of the second control device.

8. In a system for positioning a load to a selected one of a plurality of predetermined positions or to any desired position, in combination, a reversible motor for moving the load, a control device comprising a unit for causing the load to be moved through one or more complete revolutions and a unit for causing the load to be moved through a partial revolution, each unit having a member adjusted to cause movement of the load in a predetermined direction, the member of the complete revolution unit being adjusted for a number of unit distances equal to a predetermined number of revolutions through which the load is to be moved, the member of the partial revolution unit being adjusted to an extent depending upon a predetermined partial revolution through which the load is to be additionally moved, the said complete revolution unit being energized to move the load in the said predetermined direction with the said predetermined number of complete revolutions, and to energize the said partial revolution unit to continue load movement in the said predetermined direction for the said predetermined additional partial revolution; speed reducing means for the motor; means responsive to a motor reversal to render said speed reducing means operative; a second control device for moving the load in any desired position, said second control device having a neutral position and comprising a pair of relatively movable members, one of the members being selectively adjusted to control directional rotation of the said load motor to move the load to desired positions; means for moving the other member in a direction to restore the said second control device to its neutral position to stop motor rotation; and switch means selectively operated to place the load motor under the control of the first control device or under the control of the second control device, said switch means rendering the speed reducing means continuously operative when the load motor is under control of the second control device.

9. In a system for positioning a load to a selected one of a plurality of predetermined positions or to any desired position, in combination, a reversible motor for moving the load; a control device comprising a plurality of selectors, each selector including a unit for causing the load to be moved through one or more complete revolutions and a unit for causing the load to be moved through a partial revolution, each unit having a member adjusted to cause movement of the load in a predetermined direction, the member of the complete revolution unit being adjusted for a number of unit distances equal to a predetermined number of revolutions through which the load is to be moved, the member of the partial revolution unit being adjusted to an extent depending upon a predetermined partial revolution through which the load is to be additionally moved, the said complete revolution unit being energized to move the load in the said predetermined direction with the said predetermined number of complete revolutions, and to energize the said partial revolution unit to continue load movement in the said predetermined direction for the said predetermined additional partial revolution, each of said selectors being pre-set for a predetermined position of the load; first switch means for selectively energizing one of said selectors; a second control device for moving the load in any desired position, said second control device having a neutral position and comprising a pair of relatively movable members, one of the members being selectively adjusted to control directional rotation of the said load motor to move the load to desired positions; means for moving the other member in a direction to restore the said second control device to its neutral position to stop motor rotation; second switch means selectively operated to place the load motor under the control of the first control device or under the control of the second control device; means mechanically connecting the first switch means with the second switch means for placing the first switch means in a position deenergizing all the selectors, when the second switch means are operated to place the load motor under the control of the second control device.

MICHEL N. YARDENY.

REFERENCES CITED

The following references are of record in the file of this patent:

UNITED STATES PATENTS

| Number | Name | Date |
|---|---|---|
| 835,382 | Willard | Nov. 6, 1906 |
| 1,488,723 | Welsh | Apr. 1, 1924 |
| 1,508,796 | Kaminski | Sept. 16, 1924 |
| 1,693,314 | Murphy | Nov. 27, 1928 |
| 1,850,780 | Sperry et al. | Mar. 22, 1932 |
| 1,979,588 | Vreeland | Nov. 6, 1934 |
| 2,124,684 | Behr et al. | July 26, 1938 |
| 2,224,619 | Umansky | Dec. 10, 1940 |
| 2,342,717 | Yardeny | Feb. 29, 1944 |

FOREIGN PATENTS

| Number | Country | Date |
|---|---|---|
| 186,420 | Great Britain | Feb. 27, 1922 |